(12) United States Patent
Bender et al.

(10) Patent No.: US 12,509,640 B2
(45) Date of Patent: Dec. 30, 2025

(54) SHOCK ABSORBER INCLUDING A HYDRAULIC FLUID HAVING AN IMPROVED FLASH POINT

(71) Applicant: Federal-Mogul Motorparts LLC, Northville, MI (US)

(72) Inventors: Michael Bender, Carleton, MI (US); Nathan Gaynier, Monroe, MI (US)

(73) Assignee: Federal-Mogul Motorparts LLC, Northville, MI (US)

( * ) Notice: Subject to any disclaimer, the term of this patent is extended or adjusted under 35 U.S.C. 154(b) by 315 days.

(21) Appl. No.: 18/329,968

(22) Filed: Jun. 6, 2023

(65) Prior Publication Data

US 2023/0407201 A1 Dec. 21, 2023

Related U.S. Application Data

(60) Provisional application No. 63/353,290, filed on Jun. 17, 2022.

(51) Int. Cl.

| | |
|---|---|
| *C10M 101/02* | (2006.01) |
| *F16F 9/19* | (2006.01) |
| *B60G 13/08* | (2006.01) |
| *C10N 30/00* | (2006.01) |
| *C10N 30/02* | (2006.01) |
| *C10N 40/08* | (2006.01) |

(52) U.S. Cl.
CPC ............. *C10M 101/02* (2013.01); *F16F 9/19* (2013.01); *B60G 13/08* (2013.01); *B60G 2202/24* (2013.01); *B60G 2206/41* (2013.01); *B60G 2800/162* (2013.01); *C10M 2203/1025* (2013.01); *C10M 2203/1045* (2013.01); *C10M 2203/1065* (2013.01); *C10N 2030/02* (2013.01); *C10N 2030/43* (2020.05); *C10N 2040/08* (2013.01); *F16F 2222/12* (2013.01); *F16F 2224/04* (2013.01); *F16F 2228/008* (2013.01)

(58) Field of Classification Search
CPC ........ C10M 101/02; C10M 2203/1025; C10M 2203/1045; C10M 2203/1065; F16F 9/19; F16F 9/34; F16F 9/44; F16F 9/46; F16F 2222/12; F16F 2224/04; F16F 2228/008; C10N 2030/02; C10N 2030/43; C10N 2040/08; B60G 13/08; B60G 2202/24; B60G 2206/41; B60G 2800/162
USPC ....................................................... 508/110
See application file for complete search history.

(56) References Cited

U.S. PATENT DOCUMENTS

| | | | | |
|---|---|---|---|---|
| 8,058,214 B2 * | 11/2011 | Swartele | ............... | C10M 169/04 208/18 |
| 2020/0124129 A1 * | 4/2020 | Mohammadi | .......... | B21D 53/88 |

* cited by examiner

*Primary Examiner* — Christopher P Schwartz
(74) *Attorney, Agent, or Firm* — Harness, Dickey & Pierce, P.L.C.

(57) ABSTRACT

A shock absorber that includes a pressure tube that defines a working chamber having a hydraulic fluid located therein; a piston assembly positioned in the working chamber, and dividing the working chamber into an upper working chamber and a lower working chamber; and a piston rod engaged with the piston assembly that moves the piston assembly in the working chamber, wherein the hydraulic fluid includes a primary oil, a secondary oil, and an additive package, the secondary oil includes at least a gas-to-liquid oil in an amount that ranges between 4.0 wt % to 10.0 wt % relative to a total amount of the hydraulic fluid, and the hydraulic fluid includes a flash point of at least 174 degrees C.

12 Claims, 2 Drawing Sheets

SHOCK ABSORBER INCLUDING A HYDRAULIC FLUID HAVING AN IMPROVED FLASH POINT

CROSS-REFERENCE TO RELATED APPLICATIONS

This application claims the benefit of U.S. Provisional Application No. 63/353,290, filed on Jun. 17, 2022. The entire disclosure of the above application is incorporated herein by reference.

FIELD

The present disclosure relates to a shock absorber including a hydraulic fluid having an improved flash point.

BACKGROUND

This section provides background information related to the present disclosure which is not necessarily prior art.

A shock absorber (sometimes referred to as a damper) is a mechanical device designed to smooth out or damp a sudden shock impulse and dissipate kinetic energy. Shock absorbers are an important part of, for example, a vehicle (e.g., automobile, bus, train, airplane, motorcycle, bicycle, etc.) suspension system. Shock absorbers convert kinetic energy to heat energy, which can then be dissipated.

SUMMARY

This section provides a general summary of the disclosure, and is not a comprehensive disclosure of its full scope or all of its features.

According to an aspect of the present disclosure, there is provided a shock absorber that includes a pressure tube that defines a working chamber having a hydraulic fluid located therein; a piston assembly positioned in the working chamber, and dividing the working chamber into an upper working chamber and a lower working chamber; and a piston rod engaged with the piston assembly that moves the piston assembly in the working chamber, wherein the hydraulic fluid includes a primary oil, a secondary oil, and an additive package, the secondary oil includes at least a gas-to-liquid oil in an amount that ranges between 4.0 wt % to 10.0 wt % relative to a total amount of the hydraulic fluid, and the hydraulic fluid includes a flash point of at least 174 degrees C.

According to the aspect, the primary oil may include one of a mineral lubricating base oil, a synthetic lubricating base oil, and a mixture of the mineral lubricating base oil and the synthetic lubricating base oil.

According to the aspect, the mineral lubricating base oil may be selected form the group consisting of a paraffinic mineral oil, a naphthenic mineral oil, and an aromatic mineral oil.

According to the aspect, the primary oil may be present in the hydraulic fluid in an amount that ranges between 70 wt % to 95 wt % relative to the total amount of the hydraulic fluid.

According to the aspect, the additive package may include at least one selected from the group consisting of an antioxidant, an anti-wear additive, a viscosity modifier, a dispersant, a detergent, a corrosion inhibitor, a pour point additive, a pressure additive, an anti-friction lubricant, and an anti-foaming agent.

According to the aspect, the additive package may be present in the hydraulic fluid in an amount that ranges up to 20 wt % relative to the total amount of the hydraulic fluid.

According to the aspect, the hydraulic fluid may exhibit a viscosity index of 137.

According to the aspect, the hydraulic fluid may exhibit a pour point of at least −54 degrees C.

According to the aspect, the hydraulic fluid may exhibit an aniline point of at least 95.9 degrees C.

According to the aspect, the hydraulic fluid may exhibit a friction value of 2.9 N.

According to the aspect, the hydraulic fluid may exhibit a fire point of greater than 181 degrees C.

According to the aspect, the hydraulic fluid may include a sulfur content of 22 ppm or less.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
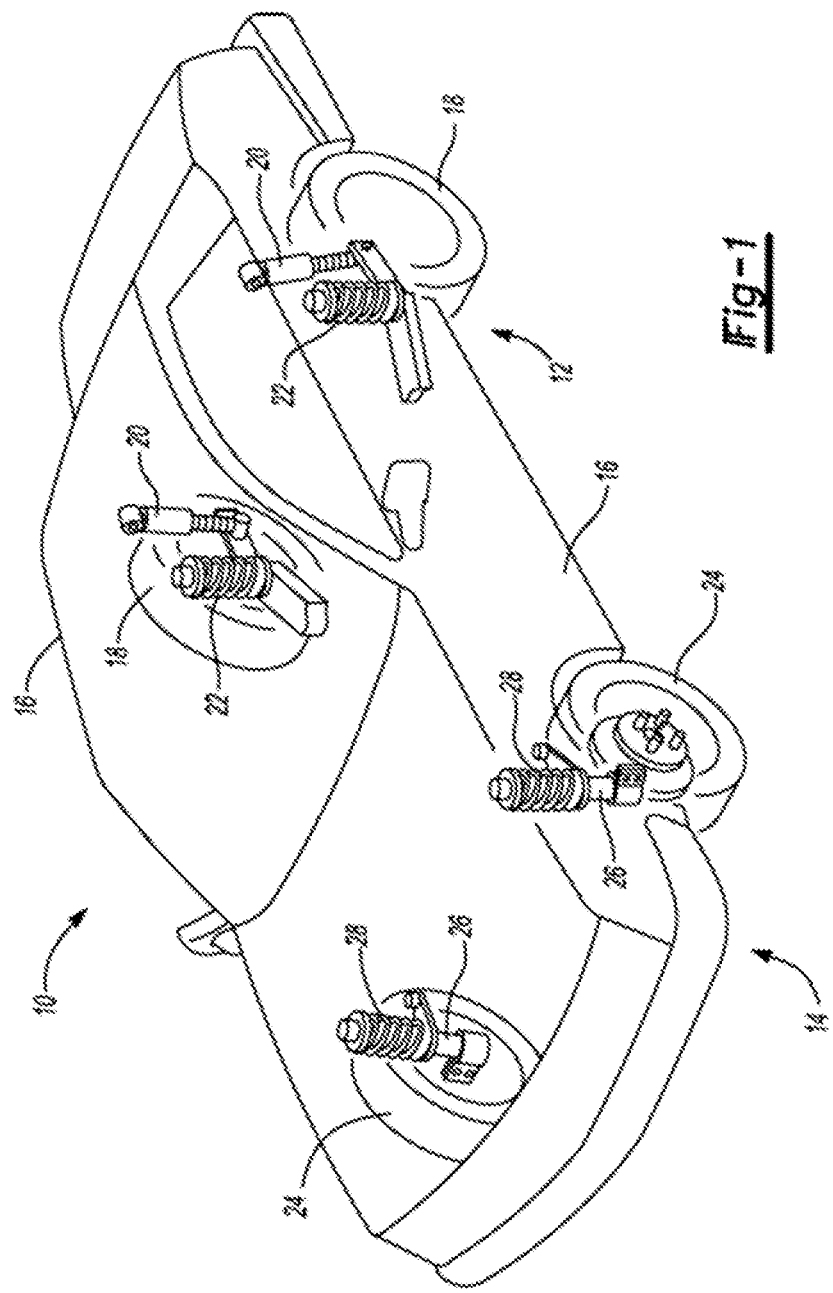
FIG. 1 illustrates an automotive vehicle, which incorporates shock absorbers in accordance with the present disclosure.

FIG. 1 illustrates the suspension system of vehicle 10. The vehicle 10 includes a rear suspension 12, a front suspension 14, and a body 16. The rear suspension 12 has a transversely extending rear axle assembly (not shown) adapted to operatively support a pair of rear wheels 18. The rear axle is attached to body 16 by a pair of shock absorbers 20 and by a pair of springs 22. Similarly, the front suspension 14 includes a transversely extending front axle assembly (not shown) to operatively support a pair of front wheels 24. The front axle assembly is attached to body 16 by a pair of shock absorbers 26 and by a pair of springs 28, which are configured in a coil-over arrangement with the pair of shock absorbers 26. Shock absorbers 20 and 26 dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
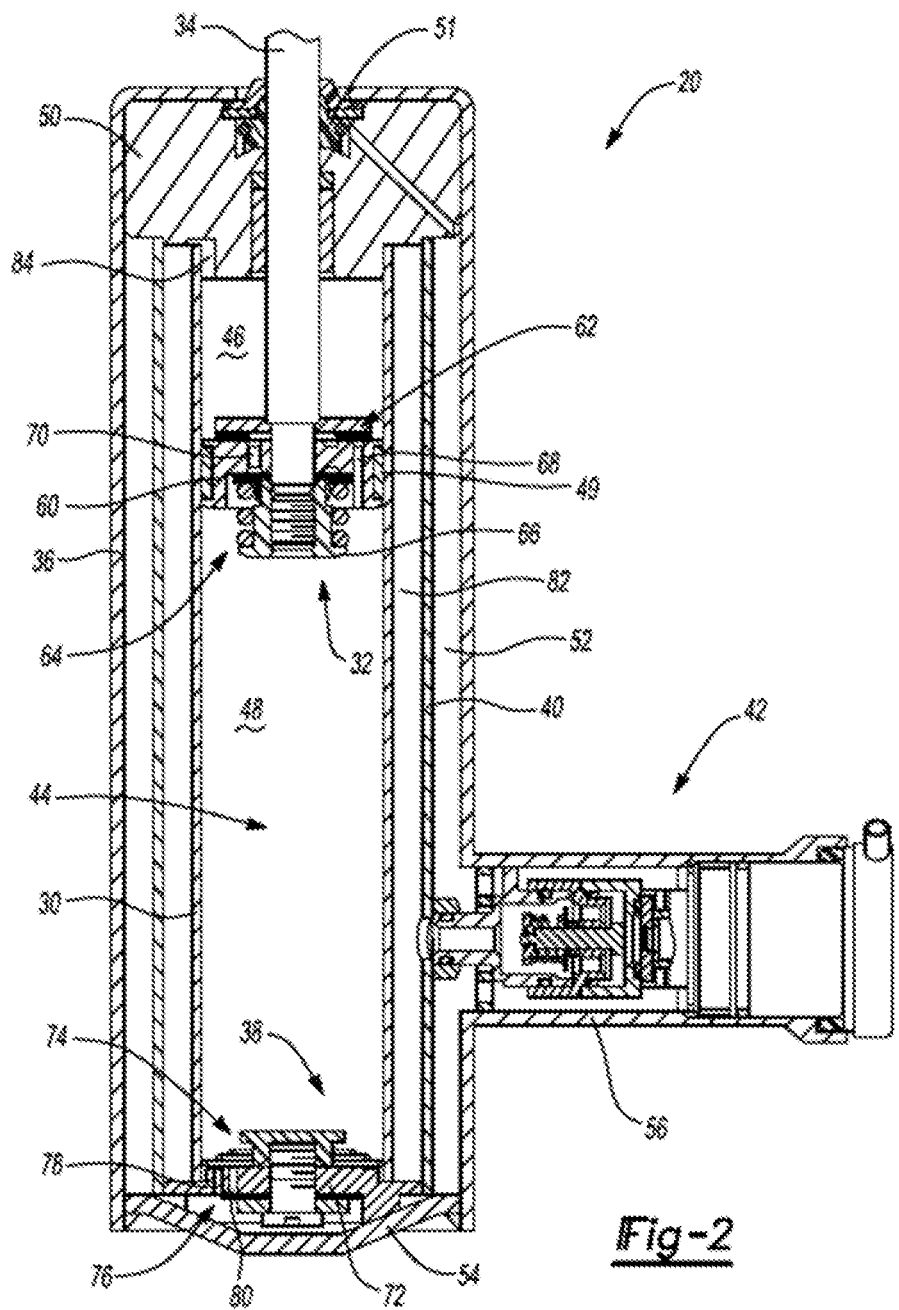
FIG. 2 is a side cross-sectional view of an example shock absorber illustrated in FIG. 1.

Referring now to FIG. 2, shock absorber 20 is shown in greater detail. While FIG. 2 illustrates only shock absorber 20, it is to be understood that shock absorber 26 also includes the design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36, a base valve assembly 38, an intermediate tube 40, and an externally mounted control valve 42.

Pressure tube 30 defines a working chamber 44. The piston assembly 32 is slidably disposed within pressure tube 30 and divides working chamber 44 into an upper working chamber 46 and a lower working chamber 48. A seal 49 is disposed between piston assembly 32 and pressure tube 30 to permit sliding movement of piston assembly 32 with respect to pressure tube 30 without generating undue frictional forces as well as sealing the upper working chamber 46 from the lower working chamber 48. The piston rod 34 is attached to the piston assembly 32 and extends through the upper working chamber 46 and through an upper rod guide assembly 50, which closes the upper ends of the pressure tube 30 and the intermediate tube 40. A seal assembly 51 seals the interface between the upper rod guide assembly 50 and the piston rod 34. The end of piston rod 34 opposite to piston assembly 32 is adapted to be secured to the sprung mass of vehicle 10. Because piston rod 34 extends only through the upper working chamber 46 and not the lower working chamber 48, extension and compression movements of the piston assembly 32 with respect to the pressure tube 30 causes a difference in the amount of fluid displaced in the upper working chamber 46 compared to the amount of fluid displaced in the lower working chamber 48. The difference in the amount of fluid displaced is known as the "rod volume" and during extension movements it flows through the base valve assembly 38. During a compression movement of the piston assembly 32 with respect to pressure tube 30, valving within the piston assembly 32 allows fluid to flow from the lower working chamber 48 to the upper working chamber 46 while the "rod volume" of fluid flow flows through the control valve 42.

Reserve tube 36 surrounds pressure tube 30 to define a fluid reserve chamber 52 located between tubes 36 and 40. The bottom end of reserve tube 36 is closed by a base cup 54, which is adapted to be connected to the unsprung mass of vehicle 10. The upper end of reserve tube 36 is attached to upper rod guide assembly 50. The reserve tube 36 includes a tubular extension 56 that extends radially outwardly away from the pressure tube 30. The control valve 42 is housed within the tubular extension 56 of the reserve tube 36.

Base valve assembly 38 is disposed between the lower working chamber 48 and the reserve chamber 52 to control the flow of fluid from the reserve chamber 52 to the lower working chamber 48. When shock absorber 20 extends in length, an additional volume of fluid is needed in the lower working chamber 48 due to the rod volume. Thus, fluid will flow from the reserve chamber 52 to the lower working chamber 48 through base valve assembly 38. When shock absorber 20 compresses in length, an excess of fluid must be removed from the lower working chamber 48 due to the rod volume. Thus, fluid will flow from the lower working chamber 48 to the reserve chamber 52 through control valve 42.

Piston assembly 32 comprises a piston body 60, a first compression valve assembly 62, and a first extension valve assembly 64. A nut 66 is threaded onto the piston rod 34 to secure the first compression valve assembly 62, the piston body 60, and the first extension valve assembly 64 to the piston rod 34. Piston body 60 defines a first plurality of compression passages 68 and a first plurality of extension passages 70. Base valve assembly 38 comprises a valve body 72, a second extension valve assembly 74, and a second compression valve assembly 76. Valve body 72 defines a second plurality of extension passages 78 and a second plurality of compression passages 80.

During a compression stroke, fluid in the lower working chamber 48 is pressurized causing fluid pressure to react against the first compression valve assembly 62. The first compression valve assembly 62 therefore acts as a check valve between the lower working chamber 48 and the upper working chamber 46. The damping characteristics of the shock absorber 20 during a compression stroke are controlled by either the control valve 42 alone or by the control valve 42 working in parallel with the base valve assembly 38. The second compression valve assembly 76 controls the flow of fluid from the lower working chamber 48 to the reserve chamber 52 during a compression stroke. The second compression valve assembly 76 can be designed as a safety hydraulic relief valve, a damping valve working in parallel with the control valve 42, or the second compression valve assembly 76 can be removed altogether from base valve assembly 38. During an extension stroke, the first plurality of compression passages 68 are closed by the first compression valve assembly 62.

During an extension stroke, fluid in the upper working chamber 46 is pressurized causing fluid pressure to react against the first extension valve assembly 64. The first extension valve assembly 64 is designed as either a safety hydraulic relief valve, which will open when the fluid pressure within the upper working chamber 46 exceeds a predetermined limit, or as a pressure valve working in parallel with control valve 42 to change the shape of the damping curve. The damping characteristics of the shock absorber 20 during an extension stroke are controlled by either the control valve 42 alone or by control valve 42 working in parallel with the first extension valve assembly 64. Replacement flow of fluid into the lower working chamber 48 during an extension stroke flows through the base valve assembly 38. Fluid in the lower working chamber 48 is reduced in pressure causing fluid pressure in the reserve chamber 52 to open the second extension valve assembly 74, which allows fluid to flow from the reserve chamber 52 to the lower working chamber 48 through the second plurality of extension passages 78. The second extension valve assembly 74 therefore acts as a check valve between the reserve chamber 52 and the lower working chamber 48. The damping characteristics of the shock absorber 20 during an extension stroke are controlled by either the control valve 42 alone or by the first extension valve assembly 64 working in parallel with the control valve 42.

Intermediate tube 40 engages the upper rod guide assembly 50 on an upper end and engages the base valve assembly 38 on a lower end. An intermediate chamber 82 is defined between intermediate tube 40 and pressure tube 30. A passage 84 is formed in upper rod guide assembly 50 for fluidly connecting upper working chamber 46 and intermediate chamber 82. The control valve 42 controls fluid flow between the intermediate chamber 82 and the reserve chamber 52. During a compression stroke of the shock absorber 20, fluid in the upper working chamber 46 can flow into the intermediate chamber 82 through passage 84 and then into the reserve chamber 52 as permitted by the control valve 42 to accommodate for the increase in rod volume in the upper working chamber 46. During an extension stroke of the shock absorber 20, fluid in the reserve chamber 52 flows through the base valve assembly 38 and into the lower working chamber 44 to replace the lost rod volume.

It should be understood that the above description relative to shock absorber 20 is merely for example purposes and the teachings of the present disclosure should not be limited to the structure of shock absorber 20. In this regard, the present disclosure is directed to an improved fluid that has an increased flash point, and the improved fluid can be used in any type of shock absorber known to one skilled in the art.

During the compression and extension strokes of the shock absorber 20, friction is developed as the fluid is compressed in the upper working chamber 46 and the lower working chamber 48 (as well as when the fluid moves into and out of the reserve chamber 52 and intermediate chamber 82). This friction creates heat that can affect operation of shock absorber 20. In this regard, greater amounts of friction may adversely affect ride quality of the vehicle and may even lead to premature failure of shock absorber 20. Thus, it is desirable for the fluid contained within shock absorber 20 to be able to operate at increased temperatures.

The hydraulic fluid contained within shock absorber 20 according to the present disclosure includes a primary oil, a secondary oil, and various additives. The primary or base oil may a mineral lubricating base oil, a synthetic lubricating base oil, or a mixture of the mineral lubricating base oil and the synthetic lubricating base oil.

As the mineral base oil, one or more mixed base oils can be selected from a paraffinic mineral oil, a naphthenic mineral oil, an aromatic mineral oil, or any other type of mineral oil known to one skilled in the art of hydraulic fluid compositions. In general, these base oils may be obtained by distillation under reduced pressure of atmospheric residual oil obtained by atmospheric distillation of crude oil, crude oils rich in naphthene, and crude oils rich in aromatics. In each case, the crude oils are subjected to solvent removal, solvent extraction, hydrocracking, solvent dewaxing, and catalytic desorption.

Synthetic base oils that can be used as the primary or base oil include polybutene or hydrides thereof; poly-α-olefins such as 1-octene oligomers and 1-decene oligomers or hydrides thereof; ditridecyl glutarate, diesters such as 2-ethylhexyl adipate, diisodecyl adipate, ditridecyl adipate, di-2-ethylhexyl sebacate; neopentyl glycol ester, trimethylolpropane caprylate, trimethylolpropane pelargonate, and pentaerythritol-2-ethylhexanoate; polyol esters such as pentaerythritol pelargonate; aromatic synthetic oils such as alkyl naphthalene, alkyl benzene and aromatic esters; and mixtures thereof.

It is desirable to reduce reliance on base oils that are manufactured from various crude oils due to environmental concerns and cost concerns due to market volatility. At this time, however, hydraulic fluid compositions that are entirely devoid of base oils that are created from crude oils are not economically feasible because such fluids are prohibitively expensive. Nonetheless, the amount of the primary base oil used in the hydraulic fluid compositions according to the present disclosure that are created from crude oils can be reduced by incorporating a secondary oil into the composition. According to the present disclosure, the secondary oil includes or consists of one or more gas-to-liquid (GTL) oils.

GTL oils are oils formed from natural gas. Inasmuch as natural gas is the cleanest-burning fossil fuel, GTL oils are generally free from contaminants inherent to conventional oils produced from crude oils. GTL oils synthesized by the Fischer-Tropsch method of converting natural gas to liquid fuel, have a very low sulfur and aromatics content compared to mineral base oils obtained from crude oil refining, and have a very high paraffin content. The GTL oil may include or consist of a single GTL oil, or may include or consist of a blend of several GTL oils with different viscosities. According to the present disclosure, the total amount of GTL oil(s) contained in the hydraulic fluid is in the range of 4.0 wt % to 10.0 wt %, and preferably in the range of about 5.0 wt % to about 5.2 wt %. The term "about" includes amounts that are within ±0.1 wt %. Most preferably, the amount of GTL oil(s) is in the range of 5.0 wt % to 5.2 wt %, which excludes amounts that are within ±0.1 wt %.

The hydraulic fluid according to the present disclosure can include one or more additives. A typical additive package for a shock absorber hydraulic fluid can include anti-oxidants, anti-wear additives, viscosity modifiers, dispersants, detergents, corrosion inhibitors, pour point additives, pressure additives, anti-friction lubricants, anti-foaming agents, a dye that fluoresces when exposed to UV light that assists in determining whether the shock absorber 20 is leaking, and any other type of additive known to one skilled in the art. An example dye that can fluoresce when exposed to UV light is a dye including a phosphorus-based fluorescent agent. The total amount of additives contained in the hydraulic fluid according to the present disclosure can be up to 20 wt %. Based on the amounts of secondary oil and additives, the amount of primary oil can range between 70 wt % to 95 wt %.

The hydraulic fluid according to the present disclosure preferably includes a viscosity index of 137, a flash point of at least 174 degrees C., a pour point of at least −54 degrees C., an aniline point of at least 95.9 degrees C., a friction value (measured in N) of 2.9, a fire point of at least, and preferably greater than, 181 degrees C., and a sulfur content of 22 ppm or less. These values are generally commensurate with conventional shock absorber hydraulic fluids such that the hydraulic fluid that includes GTL oil in a range between 4 wt % to 10 wt % does not negatively affect performance of the shock absorber 20.

Notably, the use of GTL oil in the above ranges provides an increased flash point and fire point that are about 11% greater than that achieved by a conventional shock absorber hydraulic fluid. By increasing the flash point and fire point of the hydraulic fluid, the shock absorber 20 is able to satisfactorily operate in a higher temperature range without degradation of performance. In the below Tables 1 and 2, various properties of the hydraulic fluid are illustrated.

TABLE 1

| Tests | Units | minimum specifications | Conventional Fluid (no GTL) | New Fluid (5.0 wt % to 5.2 wt % GTL) |
|---|---|---|---|---|
| KV40 | mm2/s | 10.1 to 12.3 | 11.02 | 10.77 |
| KV100 | mm2/s | 3.0 minimum | 3.11 | 2.98 |
| Viscosity Index | | 130 minimum | 152 | 137 |
| BF-40 @ −40 C. | mPa*s | 3000 maximum | 1572 | 2142 |
| Flash Point | C. | 120 minimum | 156 | 174 |
| Pour Point | C. | minus 48 maximum | minus 57 | minus 54 |
| Copper Corrosion | grade | 1b minimum | 1b | 1a |
| Density | g/mL @ 15 C. | | 0.83475 | 0.8498 |
| Aniline Point | C. | 76 minimum | 98.2 | 95.9 |
| Foaming Seq I | cm-cm | 100/0 | 30-0 | 30-0 |
| Foaming Seq II | cm-cm | 100/0 | 10-0 | 20-0 |
| Foaming Seq III | cm-cm | 100/0 | 30-0 | 30-0 |
| NOACK - 150 | wt % | | 4.3 | 5.4 |
| Friction | Newtons | | 3.3 | 2.9 |

TABLE 2

| Test | Units | ASTM Method | Conventional Fluid | New Fluid |
|---|---|---|---|---|
| Fire Point | C. | D92 | 168 | 181 |
| Sulfur | ppm | D5185 | 119 | 22 |
| H2O in Petroleum (Karl Fischer Method) | ppm | D6304 | 112 | 46 |
| Coeff. Of Thermal Exp. | /C. | D1903 | 5.4 × 10−4 | 5.66 × 10−4 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber, comprising:
   a pressure tube that defines a working chamber having a hydraulic fluid located therein;
   a piston assembly positioned in the working chamber, and dividing the working chamber into an upper working chamber and a lower working chamber; and
   a piston rod engaged with the piston assembly that moves the piston assembly in the working chamber,
   wherein the hydraulic fluid includes a primary oil, a secondary oil, and an additive package,
   the secondary oil includes at least a gas-to-liquid oil in an amount that ranges between 4.0 wt % to 10.0 wt % relative to a total amount of the hydraulic fluid, and
   the hydraulic fluid includes a flash point of at least 174 degrees C.

2. The shock absorber according to claim 1, wherein the primary oil includes one of a mineral lubricating base oil, a synthetic lubricating base oil, and a mixture of the mineral lubricating base oil and the synthetic lubricating base oil.

3. The shock absorber according to claim 2, wherein the mineral lubricating base oil is selected form the group consisting of a paraffinic mineral oil, a naphthenic mineral oil, and an aromatic mineral oil.

4. The shock absorber according to claim 1, wherein the primary oil is present in the hydraulic fluid in an amount that ranges between 70 wt % to 95 wt % relative to the total amount of the hydraulic fluid.

5. The shock absorber according to claim 1, wherein the additive package includes at least one selected from the group consisting of an antioxidant, an anti-wear additive, a viscosity modifier, a dispersant, a detergent, a corrosion inhibitor, a pour point additive, a pressure additive, an anti-friction lubricant, a dye that fluoresces when exposed to UV light, and an anti-foaming agent.

6. The shock absorber according to claim 5, wherein the additive package is present in the hydraulic fluid in an amount that ranges up to 20 wt % relative to the total amount of the hydraulic fluid.

7. The shock absorber according to claim 1, wherein the hydraulic fluid exhibits a viscosity index of 137.

8. The shock absorber according to claim 1, wherein the hydraulic fluid exhibits a pour point of at least −54 degrees C.

9. The shock absorber according to claim 1, wherein the hydraulic fluid exhibits an aniline point of at least 95.9 degrees C.

10. The shock absorber according to claim 1, wherein the hydraulic fluid exhibits a friction value of 2.9 N.

11. The shock absorber according to claim 1, wherein the hydraulic fluid exhibits a fire point of at least 181 degrees C.

12. The shock absorber according to claim 1, wherein the hydraulic fluid includes a sulfur content of 22 ppm or less.

* * * * *